United States Patent [19]

Yamamoto et al.

[11] Patent Number: 4,969,249
[45] Date of Patent: Nov. 13, 1990

[54] METHOD AND APPARATUS FOR ASSEMBLING AN INSTRUMENT PANEL IN AN AUTOMOBILE

[75] Inventors: Yasuhiro Yamamoto; Teiji Miwa, both of Sayama; Tadashi Ajima, Kameyama, all of Japan

[73] Assignee: Honda Giken Kogyo Kabushiki Kaisha, Tokyo, Japan

[21] Appl. No.: 401,608

[22] Filed: Aug. 29, 1989

Related U.S. Application Data

[62] Division of Ser. No. 278,122, Nov. 30, 1988, Pat. No. 4,876,786.

[30] Foreign Application Priority Data

Dec. 1, 1987 [JP] Japan .................. 62-301418
Dec. 1, 1987 [JP] Japan .................. 62-301419

[51] Int. Cl.⁵ ................. B23P 11/00; B23P 21/00
[52] U.S. Cl. .................. 29/429; 29/281.4; 29/281.5; 29/469; 29/786; 29/787
[58] Field of Search ........... 29/429, 281.4, 281.5, 29/430, 469, 525.1, 771, 786, 787, 791, 793, 794, 795, 822, 823, 824; 180/90; 269/51; 296/70, 72, 192, 194; 414/225; 901/7

[56] References Cited

U.S. PATENT DOCUMENTS

4,582,156 4/1986 Kochy et al. .................. 180/90
4,594,764 6/1986 Yamamoto .................. 29/430
4,597,461 7/1986 Kochy et al. .................. 180/90
4,776,084 10/1988 Naruse et al. .................. 29/771

FOREIGN PATENT DOCUMENTS

0081656 2/1988 European Pat. Off. .
57-47221 3/1982 Japan .................. 180/90
2198702A 6/1988 United Kingdom .................. 901/7

Primary Examiner—Timothy V. Eley
Attorney, Agent, or Firm—Armstrong, Nikaido Marmelstein, Kubovcik & Murray

[57] ABSTRACT

The instrument panel is clamped at both longitudinal ends thereof onto an assembly jig mounted on a robot arm. The jig holding the panel is inserted widthwise into the car cabin through a door opening. The jig is moved to a preassembly position where the end walls of the panel overlap outer side surfaces of mounting brackets previously installed in the car cabin. The end walls of the panel are then fastened in place by nut runners provided at both ends of the assembly jig. The nut runners are mounted on tool holders which are able to perform a floating movement in a plane perpendicular to the car width direction. Positioning devices are provided at both ends of the jig to correct the position of the tool holders with respect to the brackets to align and position the panel so that the mounting holes in the end walls of the panel line up with the tapped holes in the brackets.

2 Claims, 11 Drawing Sheets

METHOD AND APPARATUS FOR ASSEMBLING AN INSTRUMENT PANEL IN AN AUTOMOBILE

This is a division of application Ser. No. 278,122, filed Nov. 30, 1988, now U.S. Pat. No. 4,876,786.

This invention relates to a method and an apparatus for assembling an automobile instrument panel in which the instrument panel is automatically mounted in the front part of an automobile cabin.

A conventional method of mounting an instrument panel in the automobile cabin is disclosed by the Japanese Utility Model Application Publication No. 10908/1986. A robot having a clamping member holds the central portion of the instrument panel and puts the panel into the cabin through the windshield frame of the car body. The instrument panel now in the cabin and held by the clamping member of the robot is then fastened to the car body by an assembly worker in the cabin.

For further improvement of productivity, it is desired that the assembly procedure including the fastening of an instrument panel be totally automated.

For mounting the instrument panel onto a car body, the panel is generally placed at a suitable, recessed location about the dashboard and fastened therein to the dashboard so as not to impair an overall appearance. It is therefore difficult to automate the fastening process.

The object of the invention is to provide a method and an apparatus which can perform an automatic fastening of the instrument panel. Taking note of the fact that the outer surfaces of the end walls of both the longitudinal ends of the instrument panel cannot be seen by a driver or passengers in the car, this invention utilizes the end walls for fastening the instrument panel to the car body.

SUMMARY OF THE INVENTION

To achieve the above objective, the method of assembling the instrument panel in the car cabin according to this invention comprises the steps of:

clamping an instrument panel set on a setting jig by clamp means from both longitudinal ends of the panel so as to hold the panel on an assembly jig, the clamp means being provided at both ends of the assembly jig mounted on a robot arm;

operating the robot arm to insert the assembly jig into the car cabin through a door opening in the car body;

moving the assembly jig to a predetermined assembly position so that end walls located at the longitudinal ends of the instrument panel overlap the outer side surfaces of brackets, each of which brackets is installed on each side, widthwise of the car, of the front part of the car cabin; and fastening the end walls of the instrument panel to the corresponding brackets by fastening means each provided at both ends of the assembly jig.

The apparatus of this invention comprises:

an assembly jig mounted on a robot arm, the assembly jig having a pair of tool holders at the ends of the jig frame that extends widthwise of the car, the tool holders being able to perform a floating movement in a plane perpendicular to the widthwise direction of the car; each of the tool holders being provided with:

a clamp means for engaging with or disengaging from the outer surface of each end wall of the instrument panel, the end walls being at the longitudinal ends of the instrument panel;

a fastening means for fastening the end walls of the instrument panel to brackets, the brackets being provided at both sides, widthwise of the car, of the front part of the car cabin; and a positioning means for positioning each of the tool holders with respect to each of the brackets.

When the instrument panel is set on the setting jig, the panel is received by the assembly jig. Then, while holding the panel, the assembly jig is inserted into the car cabin through the door opening of the car body to move the panel to the predetermined assembly position and the end walls at the longitudinal ends of the panel are then overlapped with the outer side surfaces of the brackets which are provided on both sides of the front part of the car cabin.

Here, the assembly jig holds the instrument panel by a clamp means provided at both ends thereof, the clamp means clamping the panel from both longitudinal ends. This prevents any positional deviation of the end walls of the panel with respect to the assembly jig. As the assembly jig moves to the assembly position, the end walls of the instrument panel overlap the outer side surfaces of the brackets. Then the fastening means provided at each end of the assembly jig are operated to fasten the end walls to the brackets, thereby securely fixing the instrument panel to the car body.

With the apparatus for this invention, after the assembly jig is moved to the assembly position, the tool holders at each end of the jig frame are made to perform a floating movement in a plane perpendicular to the car-width direction. While the floating movement is performed by the tool holders, the positioning means are operated to position the tool holders properly with respect to the brackets. As a result, the end walls of the instrument panel held and positioned on the tool holders by the clamp means are correctly positioned with respect to the brackets so that mounting holes in the end walls are aligned with tapped holes in the brackets. The fastening means on the tool holders are then operated to securely screw bolts through the mounting holes in the end walls into the tapped holes in the brackets.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figures 13, 14:
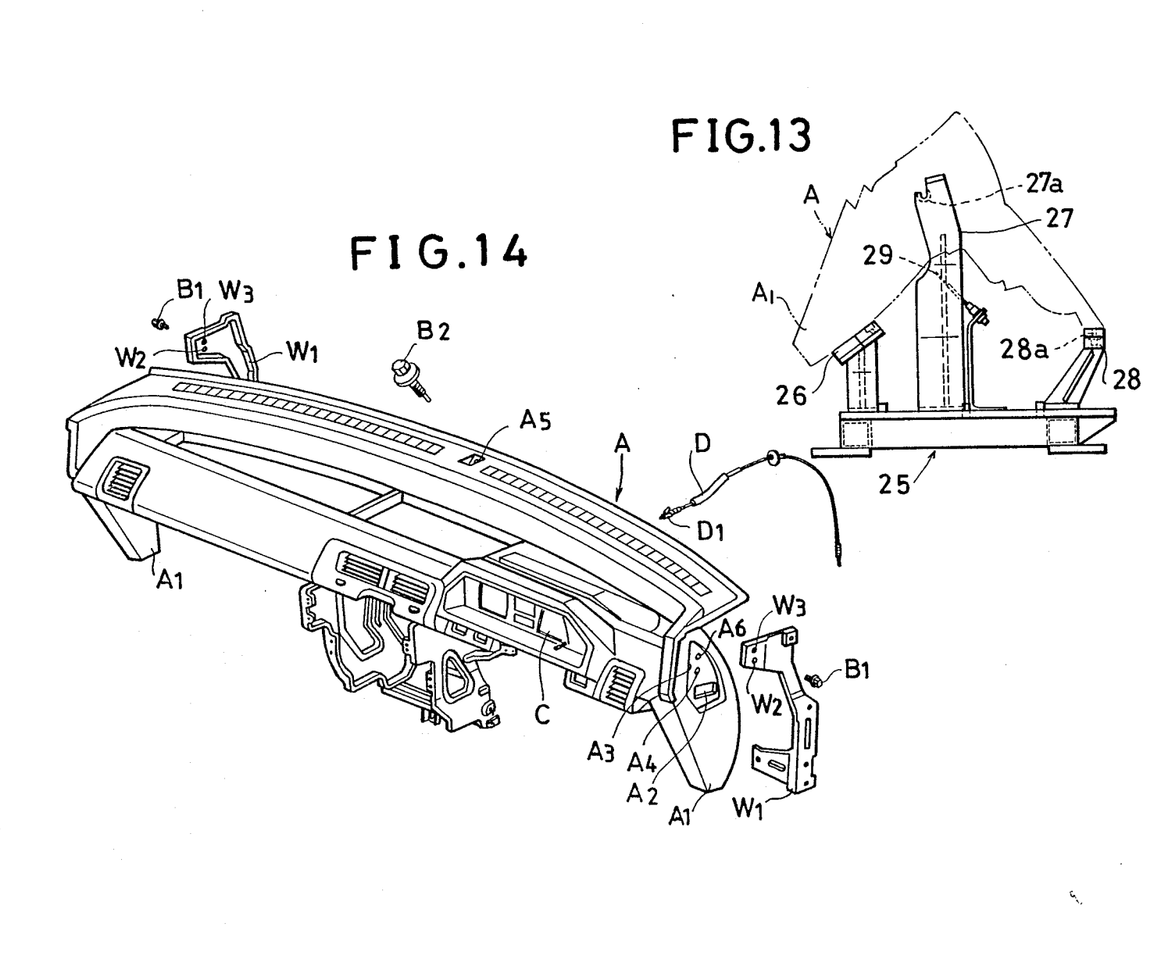
FIG. 13 is a side view thereof.
FIG. 14 is a perspective view of an instrument panel.

The attached drawings illustrate one embodiment of the present invention in which an instrument panel A shown in FIG. 14 is mounted in the front part of the cabin of the car body W. The instrument panel A has, at its longitudinal ends, end walls A1, each of which has a recess A3 provided therein with an air supply opening A2 to supply air toward the door. The end walls A1, are overlapped with the outer surfaces of brackets W1 provided in the front part of the cabin on each side, widthwise, of the car. A bolt B1 is screwed, through a first mounting hole A4 formed in the recess A3 of the end wall A1, into a tapped hole W2 of the bracket W1 to fasten the end wall A1 to the corresponding bracket W1. The instrument panel A has a second mounting hole A5 formed at the center of the front edge thereof and bolt B2 is passed through the hole A5 and tightened to fasten the instrument panel A to the upper part of the dashboard. While the panel A is being mounted, a speedometer cable D is connected to the back of the speedometer unit C which is incorporated in the panel A.

Figure 1:
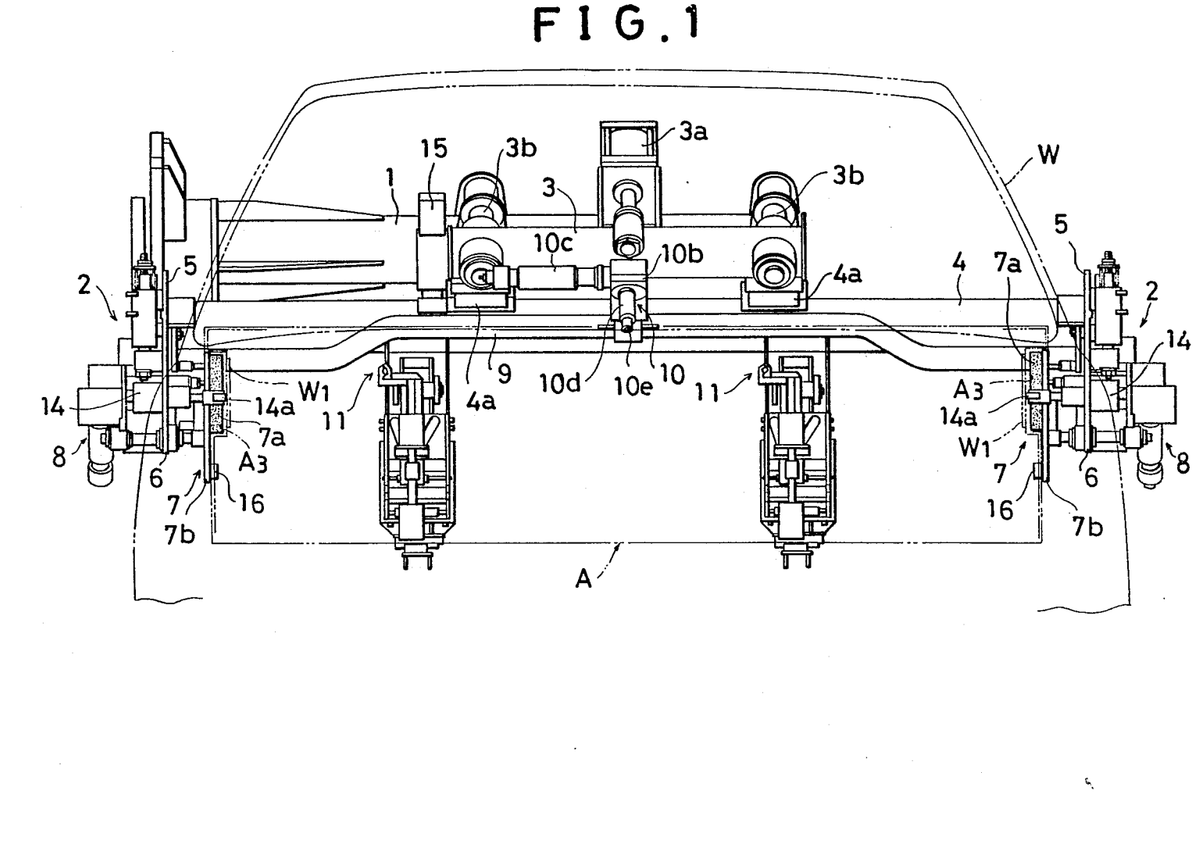
FIG. 1 is a front view of the apparatus embodying this invention.
Figure 2:
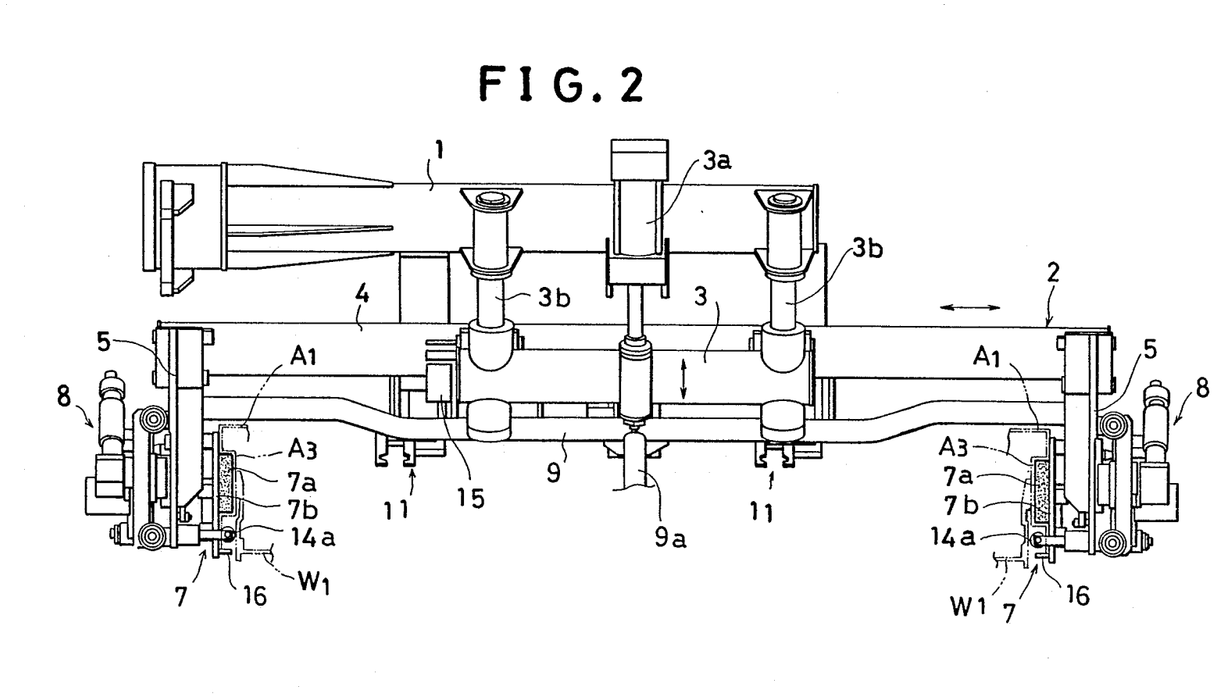
FIG. 2 is a plan view thereof.
Figure 3:
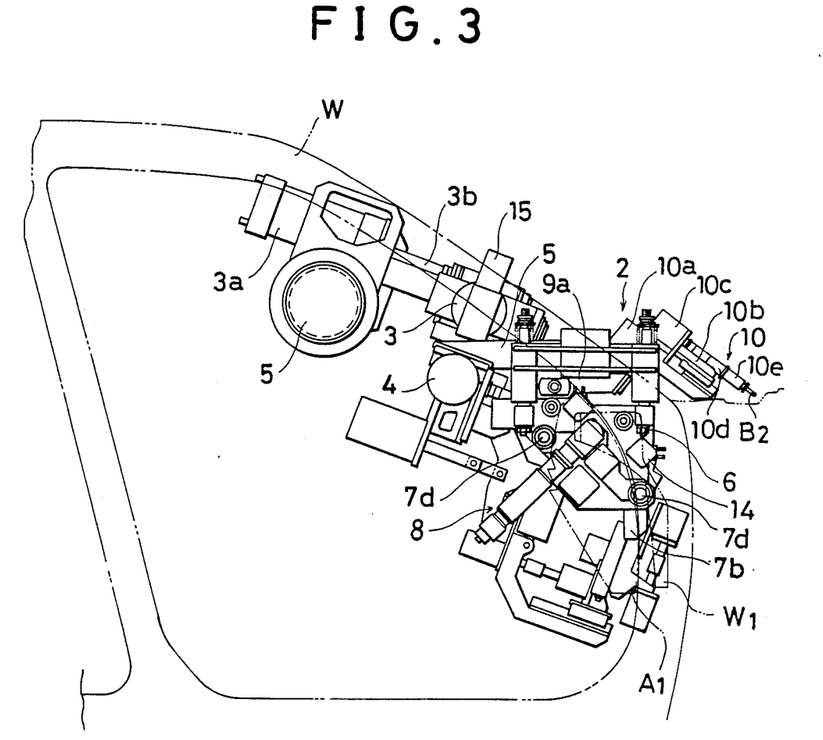
FIG. 3 is a side view thereof.

Referring to FIGS. 1 through 3, an assembly robot is disposed by the side of the assembly station that positions the car body W and has an arm 1. An assembly jig 2 is mounted on the robot arm 1. The instrument panel A held on the assembly jig 2 is moved into the car cabin as the jig 2 is moved thereinto through the door opening of the car body W. The panel A is then mounted in the front part of the cabin.

The assembly jig 2 has a base frame 3 supported on the robot arm 1 movable back and forth by a cylinder 3a along guide bars 3b, 3b. A bar-like jig frame 4 is movably supported on the base frame 3 and extends in the direction of car width. The jig frame 4 is slidable in the direction of car width through the sliders 4a, 4a. Support arms 5, 5 extending forwardly are securely attached to both ends of the jig frame 4. Tool holders 6, 6 are suspended respectively from the support arms 5, 5. Each tool holder 6 is provided with a clamp means 7 for engaging with or disengaging from the end wall A1 of the panel A and with a fastening means 8 for fastening the end wall A1 to the bracket WI at the first mounting hole A4. In addition, a rod 9 spans the tool holders 6,6. A second fastening means 10 is mounted on the rod 9 for fastening the instrument panel A to the upper part of the dashboard at the second mounting hole A5. A cable holder means 11 is provided on the jig frame 4. The cable holder means 11 holds the connecting end of the speedometer cable D which is preset in the car body W and then connects it to a cable connector C1 (see FIGS. 7 and 10) on the back of the speedometer unit C. In the embodiment shown, two cable holder means 11 are provided, one for a car with a steering wheel on the right-hand side and the other for the left-hand side steering wheel.

Figure 4:
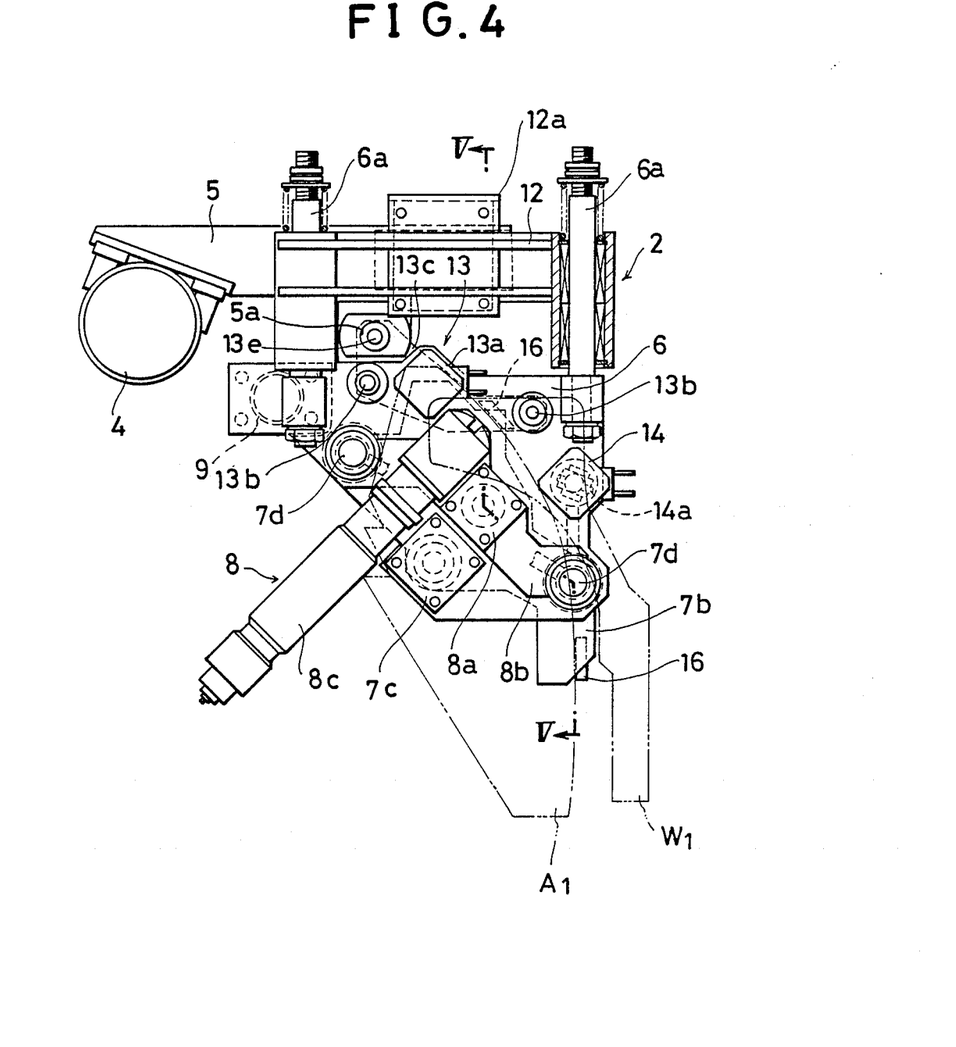
FIG. 4 is an enlarged side view of the essential part thereof.
Figure 5:
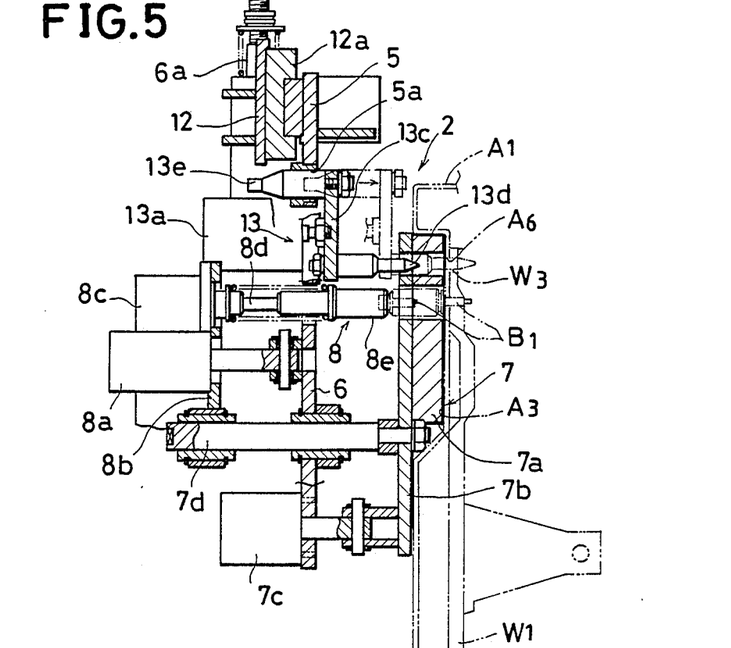
FIG. 5 is a cross-sectional view taken along the line V-V in FIG. 4.
Figure 6:
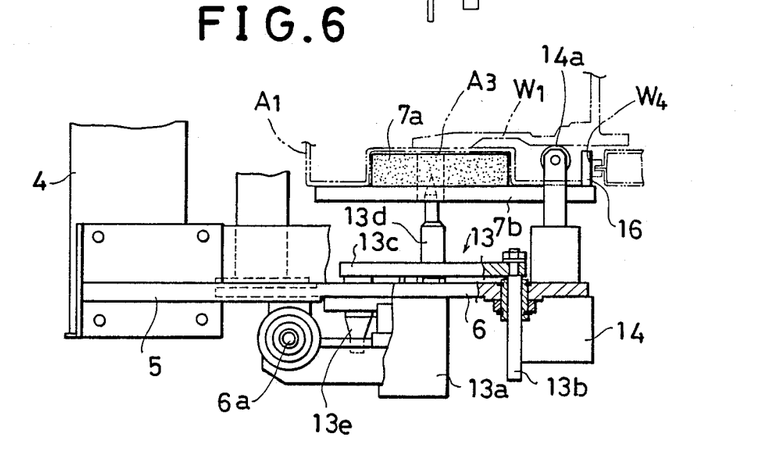
FIG. 6 is a partial cutaway plan view of FIG. 4.

The clamp means 7, as shown in FIGS. 4 to 6, has a clamping plate 7b provided with a pad 7a which fits in the recess A3 of the end wall A1. The clamping plate 7b can be moved in the direction of car width along guide bars 7d, 7d by a cylinder 7c mounted on the tool holder 6. By closing the clamping plates 7b, 7b of the pair of clamp means 7 mounted on the tool holders 6, 6 attached to both ends of the jig frame 4, (that is, by moving the clamping plates toward each other) the instrument panel A can be clamped from both sides.

The fastening means 8 has a support plate 8b that is moved in the direction of car width along the guide bars 7d by a cylinder 8a. An angled type nut runner 8c is mounted on the support plate 8b and has a fastening shaft 8d aligned with the first mounting hole A4 of the end wall A1 of the panel A which is clamped by the clamp means 7. By advancing the support plate 8b inwardly in the direction of car width and operating the nut runner 8c, the bolt B1 held on a socket 8e at the front end of the fastening shaft 8d is screwed into the tapped hole W2 in the bracket W1 through the first mounting hole A4.

The second fastening means 10, as shown in FIG. 3, has a forwardly from the center of the rod 9. The support plate 10b is moved back and forth along the axis of the second mounting hole A5 by a cylinder 10a. An angled type nut runner 10c is mounted on the support plate 10b with its fastening shaft 10d aligned with the axis of the second mounting hole A5. By movement of the support plate 10b and operation of the nut runner 10c, the bolt B2 held on a socket 10e at the front end of the fastening shaft 10d is screwed through the second mounting hole A5 into the tapped hole formed in the upper part of the dashboard.

The tool holder 6 is supported on the support arm 5 so that it can perform a floating movement in a plane perpendicular to the direction of car width. That is, as shown in FIGS. 4 to 6, a movable plate 12 is supported on the support arm 5 through a slider 12a so that it can slide back and forth. The tool holder 6 is supported on the movable plate 12 through guide bars 6a, 6a, and can slide vertically so that it can perform the floating movement in a plane perpendicular to the direction of car width by a combined operation of the movable plate 12 and the tool holder 6. The tool holder 6 is provided with a positioning means 13 which adjusts position of the tool holder 6 with respect to the bracket W1 while allowing the tool holder 6 to perform the floating movement.

The positioning means 13 comprises a cylinder 13a mounted on the tool holder 6, a movable plate 13c movable in the car width direction along guide bars 13b, 13b by the cylinder 13a, a positioning pin 13d which is securely erected on the inner surface of the movable plate 13c and which, passing through a through-hole A6 formed in the recess A3 of the end wall A1 of the instrument panel A, is fitted into a reference hole W3 formed in the bracket W1, and a lock pin 13e which is securely erected on the outer surface of the movable plate 13c and which engages with a lock hole 5a formed in the support arm 5. Normally, the movable plate 13c is retracted outwardly in the car width direction to engage the lock pin 13e with the lock hole 5a and thereby keep the tool holder 6 held at a predetermined position on the support arm 5. Then, the assembly jig 2 is moved to a predetermined assembly position where the end wall A1 overlaps the outer surface of the bracket W1 and thereafter, the movable plate 13c is advanced inwardly in the car width direction to release the lock pin 13e from the lock hole 5a, so that the tool holder 6 can perform the floating movement. In this condition the positioning pin 13d is fitted into the reference hole W3 through the through-hole A6 to get the tool holder 6 properly positioned with respect to the bracket W1. In this manner, the first mounting hole A4 formed in the end wall A1 of the instrument panel A which is positioned by the holder 6 via the clamp means 7 is aligned with the tapped hole W2 and the bracket W1.

The tool holder 6 also has a pressing cylinder 14 with a roller 14a that abuts against the outer surface of the bracket W1. When the assembly jig 2 is moved to a predetermined preassembly position in which the roller 14a sits opposite to the outer surface of the rear end part of the bracket W1, the pressing cylinder 14 is actuated to make the roller 14a press against the outer surface of the bracket W1. A reaction force generated from this pressure-contact of the roller 14a causes the jig frame 4 to slide in the car width direction relative to the base frame thereby positioning the assembly jig 2 in the car width direction with respect to the car body W. Then, the base frame 3 is advanced by the cylinder 3a to move the assembly jig 2 to the assembly position.

A lock cylinder 15 is provided to hold the jig frame 4 against the base frame 3. An engagement piece 16 is attached to the clamp plate 7b which engages with the front edge portion W4 of the door opening in the car body W.

Figure 7:
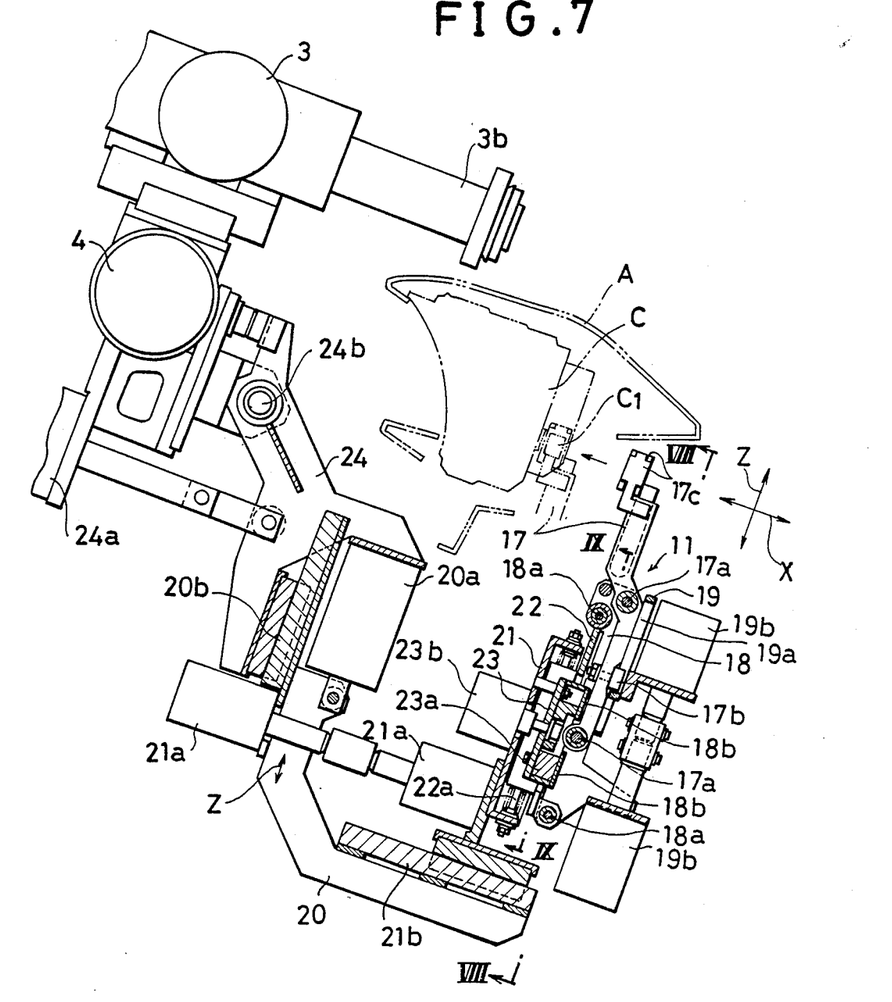
FIG. 7 is an enlarged cross-sectional side view of a cable holder means.
Figure 8:
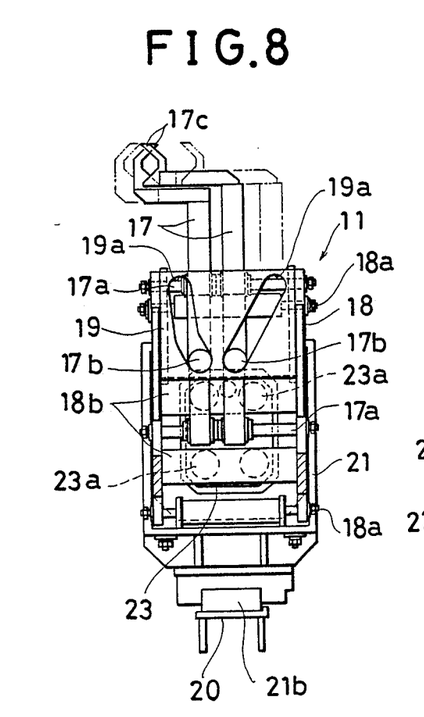
FIG. 8 and 9 are cross-sectional views taken along the line VIII—VIII and the line IX—IX, respectively, in FIG. 7.
Figure 9:
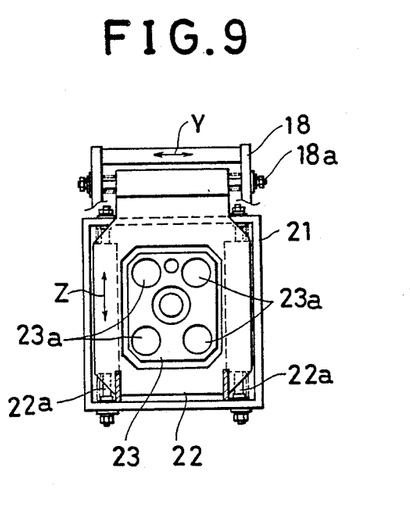

The cable holder means 11 includes as shown in FIGS. 7 to 9, a holder on which are mounted a pair of laterally extending, upper and lower guide bars 17a, 17a. A pair of clamping pieces 17, 17 are supported on and are laterally slidable along the guide bars 17a, 17a. A cam plate 19 having a pair of cam grooves 19a, 19a formed therein engaged by rollers 17b, 17b attached to the clamping pieces 17, 17 is mounted on the holder 18 in such a manner that it can be moved vertically by a pair of vertically moving double cylinders 19b, 19b. The vertical movement of the cam plate 19 causes the clamping pieces 17, 17 to open and close laterally. The closing operation thereof enables the speedometer cable D to be held between clamping portions 17c, 17c each formed in the shape of a letter V lying on its side at the upper ends of the clamping pieces 17, 17 while the cable D is kept set in aligned position. The cable holder means 11 can be advanced or retracted with respect to the assembly jig 2 along the axis of the cable connector C1 of the speedometer unit C incorporated in the instrument panel A held on the assembly jig 2. The axis of the cable connector C1 is taken as an X-axis of stationary coordinates with respect to the assembly jig 2 while two lateral and vertical orthogonal axes perpendicular to the X-axis are taken as a Y axis and a Z axis. In this arrangement, the cable holder means 11 can be moved to a desired position on the Y-Z coordinate plane.

To describe more in detail, a first movable frame 21 is provided on a support frame 20 mounted on the jig frame 4 and can be moved by double cylinders 21a, 21a in the X-axis direction along a guide rail 21b. Slidable supported on the first movable frame 21 through guide bars 22a, 22a is a second movable frame 22 which can move sliding in the Z-axis direction by the movement of the movable frame 21 and to perform the floating movement on the Y-Z coordinate plane, that is, a plane perpendicular to the X-axis, with the floating movement derived from composition of the movement in the Z-axis direction of the movable frame 22 and that in the Y-axis direction of the holder 18. In addition, a check plate 23 provided with a plurality of magnets 23a opposing cross members 18b, 18b of the holder 18 is movable in the X-axis direction toward and away from the holder 18 by a cylinder 23b mounted on the first movable frame 21 so that the advance of the check plate 23 in the X-axis direction may work to restrain the holder 18, i.e., the cable holder mans 11 with respect to the first movable frame 21.

The support frame 20 is supported on an oscillating frame 24 so that it can be moved vertically along a guide rail 20b by a cylinder 20a. The oscillating frame 24 is oscillatably mounted to the jig frame 4 through a laterally extending pivotal shaft 24b about which the oscillating frame 24 can be pivoted by a cylinder 24a.

Figure 11:
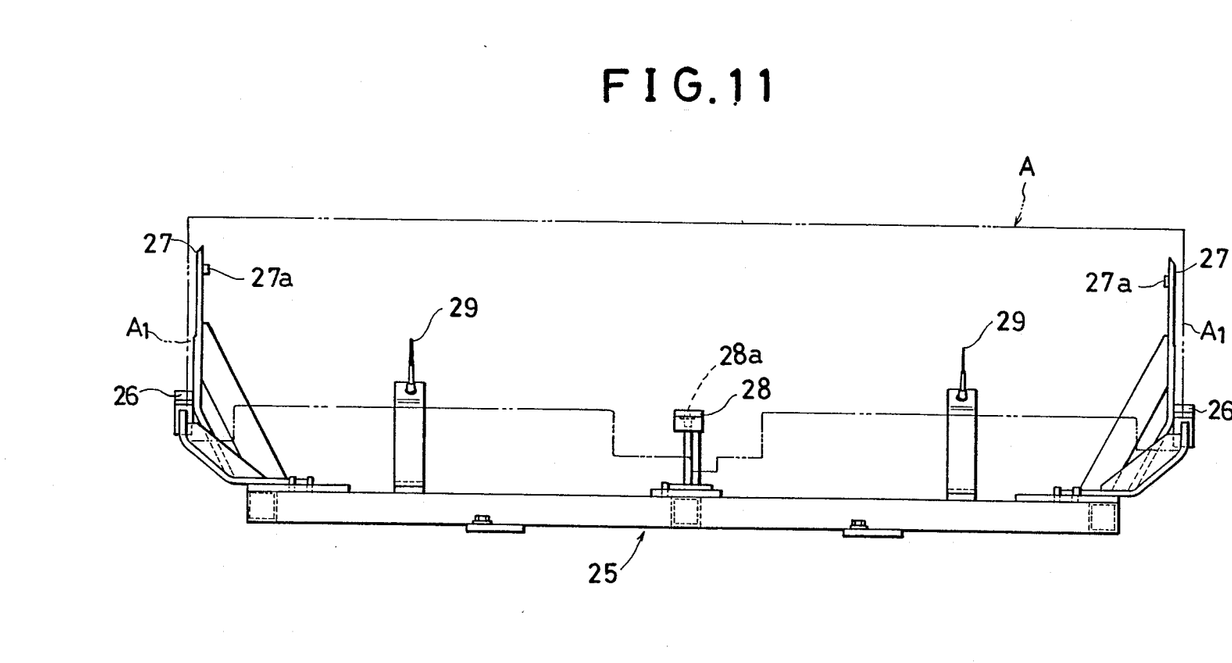
FIG. 11 is a front view of a setting jig.
Figure 12:
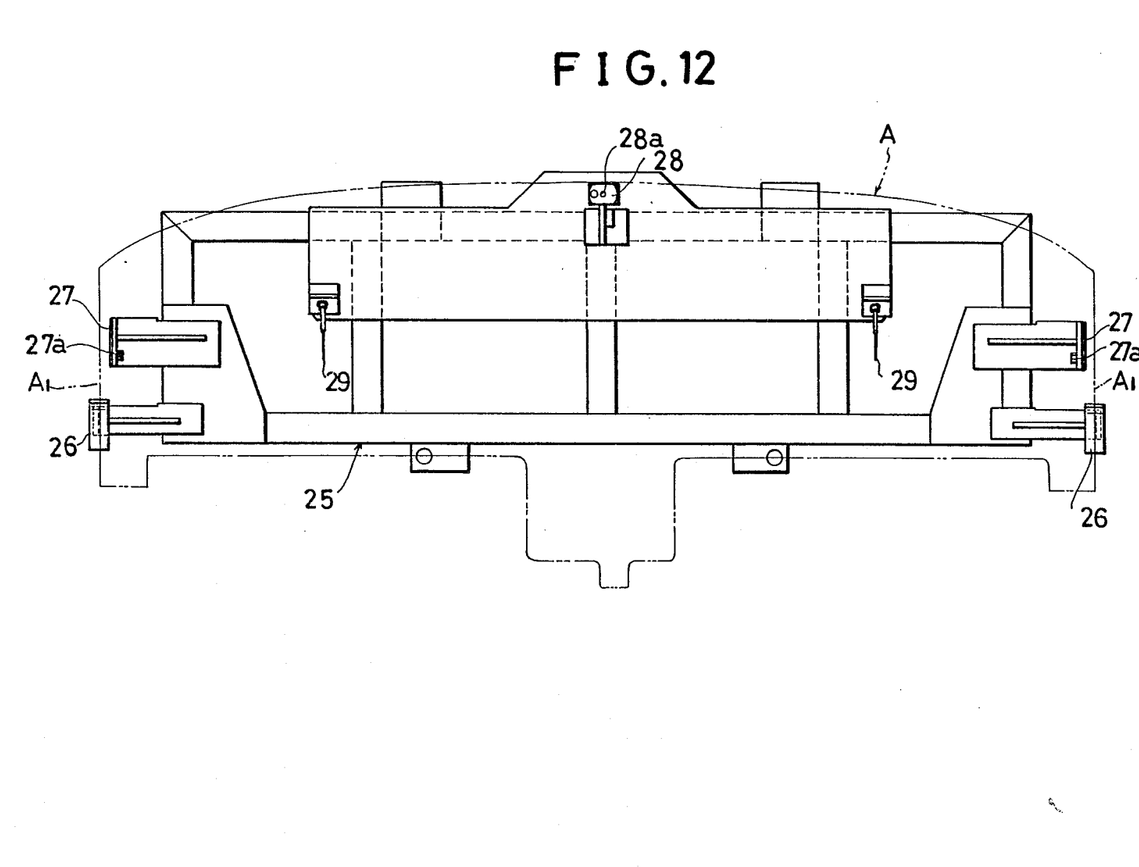
FIG. 12 is a plan view thereof.

As shown in FIGS. 11 through 13, a setting jig 25 is disposed by the side of the assembly robot. Mounted on the upper surface of the setting jig 25 are work receivers 26, 26 located at both the left-hand and right-hand ends for supporting the end walls A1, A1 of the instrument panel A, guide plates 27, 27 also located at the left and right ends to contact the inner surfaces of the end walls A1, A1, and an intermediate work receiver 28 for supporting the instrument panel A at the second mounting hole A5. The instrument panel A is set facing upward on the setting jig 25. The guide plates 27, 27 are each provided with a bolt setting member 27a and the intermediate work receiver 28 is provided with a bolt setting hole 28a. Bolts B1, B2 are passed through the mounting holes A4, A5 in the instrument panel A into these member and setting hole. A sensor 29 is provided to detect whether the instrument panel A is set or not.

The procedure for assembling the instrument panel A by using the apparatus of the above embodiment is explained below.

First, the assembly robot is operated to move the assembly jig 2 to a position over the setting jig 25 and then lower the assembly jig 2, facedown, onto the setting jig 25. The clamp plates 7b, 7b of the clamp means 7, 7 on each side are closed to clamp the instrument panel A by the end walls A1, A1 thereof in the position and posture in which the panel A has been set in advance on the setting jig 25. At the same time, the bolts B1, B2 that have been previously set in the bolt setting member 27a and the bolt setting hole 28a are received by the sockets 8e, 10e of the fastening means 8, 10. Then, the assembly jig 2 is moved up to lift the instrument panel A from the setting jig 25. The assembly jig 2 is then turned to its forward-facing posture and inserted through the door opening into the car body W positioned in place at the assembly station.

Next, the assembly jig 2 is moved to the preassembly position where it is positioned with respect to the car width direction by operation of the pressing cylinders 14, 14 of the tool holders 6, 6 on each side.

At this time, the cable holder means 11 is moved in advance along the X-axis by the movable frame 21 to the retracted position where the cable holder means is aligned with the cable connector C1 of the speedometer unit C built into the instrument panel A. With the holder 18 released from the binding by the check plate 23, the clamping pieces 17, 17 are closed to clamp the connector C1 between the clamping portions 17c, 17c at the upper ends thereof (as indicated by the imaginary line in FIG. 7). This assembly procedure has the following advantage. If the cable connector C1 is deviated from the correct position on the Y-Z coordinate plane with respect to the assembly jig 2 due to positional deviation of the speedometer unit C relative to the instrument panel A, the position of the cable holder means 11 is adjusted as follows. That is, the cable holder means 11 is moved on the Y-Z coordinate plane with respect to the cable connector C1 until the clamping center located between the clamping portions 17c, 17c is aligned with the axis of the cable connector C1. The check plate 23 is operated to bind the holder 18.

The cable holder means 11 is positioned thereby with respect to the first movable frame 21 such that its clamping center remains aligned with the axis of the cable connector C1 even when the clamping pieces 17, 17 are open. In this condition, the support frame 20 and the first movable frame 21 are operated to lower the cable holder means 11 and then move it to the advanced position in the X-axis direction.

The speedometer cable D is set in advance in the car body W prior to the above steps. More specifically, as shown in FIG. 10, the cable D is placed on the hanger beam W5 located at the end of the steering wheel hanger stay W4 of the car body W so that when the assembly jig 2 is moved to the preassembly position, the connecting end of the cable D may be positioned to face the cable connector C1 in the X-axis direction.

When the assembly jig 2 is moved to the preassembly position as in the foregoing, the cable holder means 11 is located at a position indicated by "a" of FIG. 10 immediately below the cable D which projects from the hanger beam W5. Then, by movement of the support frame 20, the cable holder means 11 is moved up to a position "b" of FIG. 10 at which the Y-Z coordinate plane of the clamping center of the clamp means 11 is the same as when the clamp means 11 clamps the cable connector C1. The clamping pieces 17, 17 are closed to hold the cable D between the clamping portions 17c, 17c. This makes the cable D so positioned as to be aligned with and face the cable connector C1 in the X-axis direction. Thereafter, by retracting the holder means 11 in the X-axis direction, the connecting fixture D1 attached to the end of the cable D is fitted into the cable connector C1 for connection at the position "c" indicated on FIG. 10.

Figure 10:
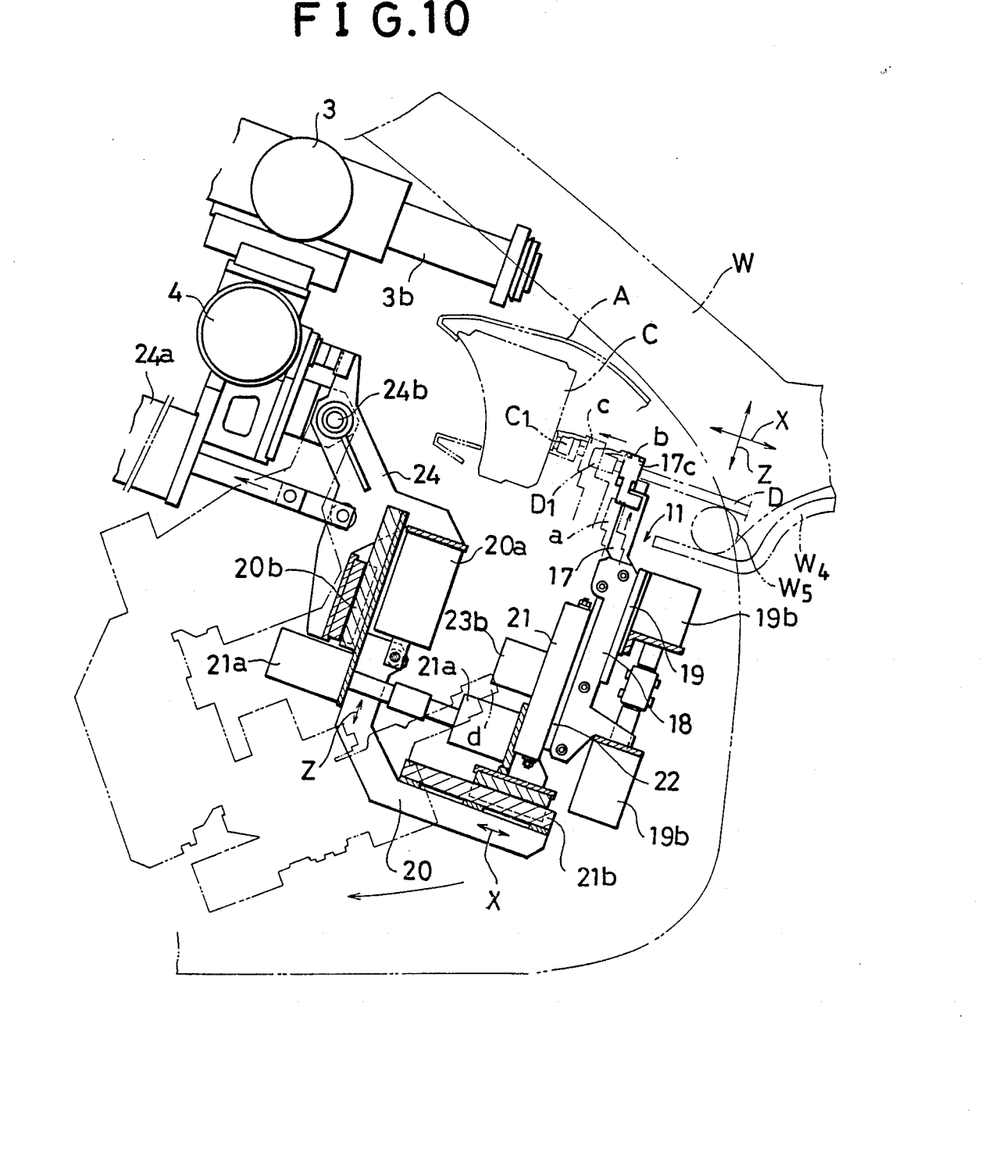
FIG. 10 is an explanatory view showing the operation of the cable holder means.

With the speedometer cable D connected to the cable connector C1 as above, the clamping pieces 17, 17 are opened and the cable holder means 11 is oscillated by the oscillating frame 24 to a lower release position indicated by "d" on FIG. 10. With the cable holder means 11 in this lower position, the assembly jig 2 is moved to the assembly position by movement of the base frame 3 in order to have the end walls A1, A1 of the instrument panel A overlapped with the outer surfaces of the brackets W1. The tool holder 6 is then adjusted in position with respect to each of the brackets W1 by operation of the positioning means 13. This process aligns the first mounting hole A4 formed in each end wall A1 with the tapped hole W2 formed in each bracket W1. At the same time, the above process aligns the second mounting hole A5 formed at the center of the front edge of the instrument panel A with the tapped hole formed in the upper part of the dashboard. Then, operating the fastening means 8, 10 causes the bolt B1 to be screwed through the first mounting hole A4 into the tapped hole W2 in the bracket W1 and the bolt B2 to be screwed through the second mounting hole A5 into the tapped hole in the upper part of the dashboard, thus assembling the instrument panel into the front part of the car cabin.

As explained above, the assembly method according to this invention comprises the steps of: holding the instrument panel by the assembly jig which clamps the panel from both ends; operating the robot arm to move the assembly jig in such a way that the end walls of the instrument panel may overlap the outer surfaces of the brackets provided at each side in the front part of the car cabin; and fastening the end walls of the instrument panel to the brackets. The assembly jig used in the above assembly procedure has a simple construction which has at each end a clamp means and a fastening means. The above method using the simple assembly jig makes it possible to assemble the instrument panel in the front part of the car cabin all automatically, thus realizing a remarkable improvement in productivity.

The assembly apparatus according to this invention is such that by making positional adjustment with respect to each bracket of the tool holders provided at both ends of the assembly jig having a clamp means and a fastening means, the instrument panel can be properly fastened to the bracket even when there is a relative positional deviation between the assembly jig and the bracket. This reduces the incidents of defective assembly and makes substantial improvements in productivity.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is a claimed is:

1. A method of assembling an automobile instrument panel in which the instrument panel is mounted in the front part of the cabin of a car body, said method comprising the steps of;
   clamping an instrument panel set on a setting jig by clamp means from both longitudinal ends of the panel so as to hold the panel on an assembly jig, the clamp means being provided at both ends of the assembly jig mounted on a robot arm;
   operating the robot arm to insert the assembly jig into the car cabin through a door opening in the car body;
   moving the assembly jig to predetermined assembly position so that end walls located at the longitudinal ends of the instrument panel overlap the outer side surfaces of brackets, each bracket being preinstalled on each side, widthwise of the car, of the front part of the car cabin; and
   fastening the end walls of the instrument panel to the corresponding brackets by fastening means provided at both ends of the assembly jig.

2. An apparatus for assembling an automobile instrument panel comprising:
   an assembly jig mounted on a robot arm, the assembly jig having a pair of tool holders at the ends of the jig frame that extends widthwise of the car, the tool holders being able to perform a floating movement in a plane perpendicular to the widthwise direction of the car, each of the tool holders being provided with:
   a clamp means for engaging with or disengaging from the outer surface of each end wall of the instrument panel, the end walls being at the longitudinal ends of the instrument panel;
   a fastening means for fastening the end walls of the instrument panel to brackets, the brackets being provided at both sides, widthwise of the car, of the front part of the car cabin; and
   a positioning means for positioning each of the tool holders with respect to each of the brackets;
   whereby the end walls of the instrument panel are overlapped with the outer surfaces of the brackets and then fastened to them.

* * * * *